Patented Nov. 19, 1935

2,021,863

UNITED STATES PATENT OFFICE 2,021,863

MANUFACTURE OF ARTIFICIAL MATERIALS

Leon Lilienfeld, Vienna, Austria

No Drawing. Application June 27, 1930, Serial No. 464,427. In Austria July 15, 1929

25 Claims. (Cl. 18—54)

This invention is an improvement in or a modification of that described in my copending U. S. specification No. 435,649.

In said application is described a process of making artificial materials, for example artificial silk, by mixing a halogen derivative of a polyhydroxylic alcohol, (e. g. a halohydrin such as monochlorhydrin or epichlorhydrin or ethylene bromhydrin) with viscose, and thereafter forming the product of this step into an artificial material (e. g. thread) and treating the latter (either with or without preliminary coagulation by dilute acids, acid salts and the like) with a plasticizing bath such as sulphuric acid of at least 35%, preferably under some tension, and finally washing, drying and the like.

The products have good luster, high wet and dry tenacity, and a considerable degree of extensibility and of elasticity.

This present invention relates to the manufacture of artificial materials, particularly artificial threads, which have not only a high tenacity in dry and wet condition, but also a sufficiently high extensibility, by bringing together viscose and one or more trithiocarbonic acid esters, particularly one or more trithiocarbonic acid esters of polyvalent alcohols, such as glycol, glycerine or the like, giving the product thus obtained the form of an artificial material, for example a thread, and then subjecting the so shaped solution to the action of one or more agents which have a coagulating effect on the shaped solution and a plasticizing effect on the coagulated artificial material or thread. Particularly suitable plasticizing agents for the purpose of the invention are strong mineral acids, particularly precipitating baths which contain not less than 35 per cent., advantageously not less than 50 per cent. of $H_2SO_4$, or an equivalent quantity of another strong mineral acid.

Whether in this invention the trithiocarbonic acid ester acts only simply as an agent imparting elasticity, or whether it reacts with the viscose to form cellulose compounds in which groups or radicals imparting elasticity are introduced into, or attached to, the cellulose molecule, is at the present time not absolutely proven.

Some observations, for example the fact that the artificial materials, for instance artificial threads, produced according to the present invention do not lose their extensibility after being repeatedly extracted with hot alcohol, hot ether and hot pyridine (which are solvents for the trithiocarbonic acid esters) appears to support the second of the aforesaid alternatives.

In certain experiments I have furthermore been able to establish the presence of the corresponding alkyl groups in bodies that had been precipitated by acidification of reaction mixtures obtained by incorporating a trithiocarbonic acid ester with viscose. Thus, for instance, a body precipitated by means of sulphuric acid of 10 per cent. strength from a reaction mixture obtained by incorporating with viscose 50 per cent. (based on the amount of cellulose) of diglycerine trithiocarbonate, after being repeatedly extracted with hot alcohol, hot ether and hot pyridine, yielded, on being analyzed by Zeisel's method a certain quantity of $C_3H_7I$ (for instance in some cases corresponding with about 3 per cent. of $C_3H_7O$). Such bodies yielded $C_3H_7I$ even after having been boiled with an alcoholic caustic potash solution of 20 per cent. strength for 24 hours. These analytical results, obtained in some cases, would indicate the formation of the corresponding alkyl- or oxyalkyl- groups respectively, being linked ether-fashion to the cellulose molecule.

In view of the imperfect knowledge regarding the constitution of cellulose and derivatives thereof on the one hand, and in view of the numerous possibilities in the present case on the other hand, and finally in view of the deficiencies of the pertinent analytical methods, I have not yet been able to procure completely positive information regarding the chemistry of this process, such as would defy all criticism.

Consequently, I do not desire to limit this invention to any formulae or definitions in respect of the products, since while the products are perhaps (as I believe) compounds or derivatives of the types mentioned, the final composition of the products is not definitely known.

Since the practice of the process is (with the exception above noted) exactly as set forth in the aforesaid copending specification 435,649 and explained therein by aid of numerous examples, it appears superfluous to repeat here all particulars relating to the carrying out of the present process under various working conditions and to give here examples demonstrating all possible modifications of working of the present invention. In conjunction with the detailed description and the some of the examples of U. S. specification No. 435,649, the following examples appear to be sufficient to illustrate the practical execution of the invention which, however, is by no way limited to these examples.

A. EXAMPLE FOR PRODUCING α-α'-TRITHIOCARBONIC ACID GLYCERINE ESTER

Although the methods of preparation of trithiocarbonic acid esters are well known, it may be advisable, before giving examples illustrating the present invention, to show in a separate example, for which α-α'-trithiocarbonic acid glycerine ester is chosen, how trithiocarbonic acid esters may be produced.

Sulphuretted hydrogen is passed into 600 grams of caustic soda solution of 20 per cent. strength at room temperature until the increase in weight amounts to about 102 grams. This forms sodium hydrosulphide, NaHS. Then a further 600 grams of 20 per cent. caustic soda solution are added (forming sodium sulphide, $Na_2S$) and, finally 240 grams of carbon disulphide are added with agitation, forming sodium trithiocarbonate solution. The mixture is then mixed with 2000 cc. of alcohol of 96 per cent. strength and 400 cc. of ether, whereupon the sodium trithiocarbonate separates in the form of a liquid layer. After separation of the layer in a separating funnel the product of the reaction is freed from excess of carbon disulphide and alcohol, or ether, in a vacuum at room temperature. There are obtained about 850 to 900 grams of an intensely red sodium trithiocarbonate solution.

800 grams of this solution are mixed, with shaking or stirring, with 272 grams of α-dichlorohydrine added in portions and during the reaction the temperature is kept at between 40 and 50° C. After a short time there separates a copious quantity of a dark yellow liquid which settles. For completion of the reaction the mixture is allowed to stand at a temperature of 40 to 50° C.; thereafter it is mixed with 1800 grams of water, thoroughly stirred again, the mother liquor decanted and the oil washed thoroughly with water by decantation and dried in a vacuum.

The final product which most probably is α-α'-trithiocarbonic acid ester of glycerine (glycerine-α-α'-trithiocarbonate) is a somewhat viscous yellowish oil of characteristic odour.

In the foregoing example, the operation may be varied by acidifying the reaction mixture after the addition of the 1800 grams of water, for example with $H_2SO_4$ of 10% strength, and then starting the washing.

Finally, the mother liquor may be separated from the final product by shaking out the reaction mixture with ether, after the reaction is completed and after the reaction mixture has been diluted with water, the ethereal solution being washed a few times with water and the ether then distilled.

If in the foregoing example there is used β-dichlorohydrine instead of α-dichlorohydrine, there is produced α-β'-trithiocarbonic acid ester of glycerine (glycerine-α-β'-trithiocarbonate).

If, with corresponding adjustment of the proportions, one starts from α- or β-monochlorohydrine, there is produced α- or β-trithiocarbonic acid ester of glycerine (glycerine-α- or β-trithiocarbonate).

Instead of the chlorohydrines there may be used equivalent quantities of the corresponding bromohydrines or iodohydrines.

Analogous bodies are obtained if one starts from epimono- or epidi-halogenhydrines.

B. EXAMPLES FOR PRODUCING ARTIFICIAL MATERIALS ACCORDING TO THE PRESENT INVENTION

*Example 1.—Production of viscose*

100 parts of wood-pulp (water content=8 per cent.) or cotton linters (water content=6 to 7 per cent.) are introduced into 2000 parts of caustic soda solution of 18 per cent. strength at 15° C. and are allowed to remain therein for 3 hours; the alkali cellulose is then pressed until, in the case of wood-pulp, it weighs 300 parts and in the case of linters 340 parts, then comminuted at 11 to 15° C. for 2½ to 3 hours; there are then added in the case of wood-pulp 40 parts and in the case of linters 60 parts of carbon disulphide, which is allowed to act for 8 hours at 18 to 20° C., whereupon any excess of carbon disulphide is blown off in the course of 10 to 15 minutes and the xanthate thus obtained is dissolved with use of so much caustic soda and water that the solution (i. e. the viscose produced) contains about 6.5 per cent. of cellulose analytically determinable and 5 per cent. of NaOH (giving about 1400 parts of viscose).

*Production of the spinning solution—Example A*

When dissolution is complete, 30 parts of α-α'-trithiocarbonic acid glycerine ester are added to the viscose produced as described in the preceding paragraph and thoroughly stirred in; the thus obtained solution is filtered three times through cotton, two filtrations occurring soon after the addition and stirring in of the ester, while the third occurs directly before the spinning operation. The spinning solution which, calculated from the xanthate dissolving step, has aged for 96 to 100 hours at 15° C. is spun as follows:—

*Spinning operation*

(a) The spinning solution is forced at a rate of 1.6 cc. per minute through a platinum nozzle which has 100 perforations of 0.08 mm. diameter, into a bath which contains 56 per cent. of $H_2SO_4$ and has a temperature of 16° C. the threads having a length of immersion of 20 centimetres in the sulphuric acid; the threads are allowed to travel a distance of 165 centimetres through the air and are wound up on a bobbin which revolves at such a speed that the threads are spun at a rate of about 18 metres per minute. In the path of the threads through the air there are arranged three glass rods at an angle to each other over which the threads pass and which exert an additional stretch or draught on the threads. The lower part of the bobbin runs in water so that the sulphuric acid is separated or considerably diluted as soon as the threads arrive on the bobbin. The threads are then washed, purified, dried, twisted and finished in the usual manner.

(b) The operation is as in (a), but with the difference that 3 cc. of the spinning solution are discharged per minute and that the speed of spinning is 30 metres per minute.

(c) The operation is as in (a), but with the difference that 6.2 cc. of the spinning solution are discharged per minute, that the speed of spinning is 40 metres per minute and that the precipitating bath contains 55 per cent. of $H_2SO_4$.

(d) The operation is as in (a), but with the difference that 3.3 cc. of the spinning solution are discharged per minute, that the nozzle has 54 perforations of 0.1 mm. diameter and that the temperature of the setting bath is 0° C.

(e) The operation is as in (a), but with the difference that 3 cc. of spinning solution are discharged per minute, that the nozzle has 24 perforations of 0.1 mm. diameter, that the precipitating bath contains 55 per cent. of $H_2SO_4$ and has a temperature of 0° C. and that the length of immersion of the threads in the bath is 80 centimetres.

(f) Mode of operation as in (c), but with the difference that 14 cc. of the spinning solution are discharged per minute, that the speed of spinning is 120 metres per minute and no additional stretch is given to the thread.

(g) The mode of procedure is as in (a), or (b), or (c), or (d), or (e), or (f), but with the difference that the strength of the sulphuric acid is 40 per cent. of $H_2SO_4$.

II. (a) to (g)

The process is conducted as in any one of the Examples I (a) to (g), (the production of the viscose and of the spinning solution remaining as above) but with the difference that the spinning solution made as described above has been allowed to age for 72 hours only (calculated from the time at which the dissolution of the viscose occurs).

The concentrations of the spinning baths are as follows:

Spinning method (a) 60 to 63 per cent. of $H_2SO_4$
Spinning method (b) 62 to 64 per cent. of $H_2SO_4$
Spinning methods (c) and (f) 62 to 65 per cent. of $H_2SO_4$
Spinning method (d) 64 to 67 per cent. of $H_2SO_4$
Spinning method (e) 62 to 65 per cent. of $H_2SO_4$
Spinning method (g) 40 per cent. of $H_2SO_4$

III. (a) to (g)

The process is conducted as in any one of the Examples I (a) to (g), but with the difference that, in the production of the spinning solution, instead of 30 parts of trithiocarbonic acid glycerine ester, only 20 parts thereof were incorporated with the viscose.

IV. (a) to (g)

The mode of procedure is as in any one of the Examples III (a) to (g), but with the difference that the spinning solution was allowed to age for 60 hours only (calculated from the time at which the dissolution of the viscose occurs).

The concentrations of the spinning baths are as follows:—

Spinning method (a) 64 to 68 per cent. of $H_2SO_4$
Spinning method (b) 66 to 70 per cent. of $H_2SO_4$
Spinning methods (c) and (f) 68 to 71 per cent. of $H_2SO_4$
Spinning method (d) 70 to 73 per cent. of $H_2SO_4$
Spinning method (e) 65 to 68 per cent. of $H_2SO_4$
Spinning method (g) 40 per cent. of $H_2SO_4$

V. (a) to (g)

(a) The manufacture of the viscose differs from that used in Example 1 only in that for the dissolution of the cellulose xanthate so much caustic soda and water are used that the solution obtained contains about 6.5 per cent. of cellulose analytically determinable and 8 per cent. of NaOH.

After complete dissolution there are added to the viscose 30 parts of trithiocarbonic acid glycerine ester, which are well stirred in, and then the solution is filtered as prescribed in Example I and after maturing for 96 to 100 hours is spun under the following conditions:—

The spinning solution is forced at a rate of 1.6 cc. per minute through a platinum nozzle which has 100 perforations of 0.08 mm. diameter, into a bath which contains 63 to 68 per cent. of $H_2SO_4$ and has a temperature of 16° C. the threads having a length of immersion of 20 centimetres in the sulphuric acid; the threads are allowed to travel a distance of 165 centimetres through the air and are wound up on a bobbin which revolves at such a speed that the threads are spun at a rate of about 18 metres per minute. In the path of the threads through the air there are arranged three glass rods at an angle to each other over which the threads pass and which exert an additional stretch or draught on the threads.

The lower part of the bobbin runs in water so that the sulphuric acid is separated or considerably diluted as soon as the threads arrive on the bobbin. The threads are then washed, purified, dried, twisted and finished in the usual manner.

(b) Mode of operation as in (a), but with the difference that 3 cc. of the spinning solution are discharged per minute and that the speed of spinning is 30 metres per minute.

(c) The operation is as in (a), but with the difference that 6.6 cc. of spinning solution are discharged per minute and that the speed of spinning is 40 metres per minute.

(d) The mode of operation is as in (a), but with the difference that the nozzle has 54 perforations of 0.1 mm. diameter and that the precipitating bath contains 66 to 70 per cent. of $H_2SO_4$ and has a temperature of 0° C.

(e) The mode of operation is as in (a), but with the difference that the nozzle has 24 perforations of 0.1 mm. diameter, that the precipitating bath contains 66 per cent. of $H_2SO_4$ and has a temperature of 0° C., that the length of immersion of the threads in the bath is 80 centimeters and that the speed of spinning is 18 metres per minute.

(f) Mode of procedure as in (c), but with the difference that 14 cc. of the spinning solution are discharged per minute, that the speed of spinning is 120 metres per minute and that no additional stretch is given to the thread.

(g) The mode of operation is as in (a), or (b), or (c), or (d), or (e), or (f), but with the difference that the strength of the sulphuric acid is 40 per cent. of $H_2SO_4$.

VI. (a) to (g)

The spinning solution differs from that used in Example V in that, instead of 30, only 20 parts of trithiocarbonic acid glycerine ester are incorporated with the viscose, in making the spinning solution.

The concentrations of the spinning baths are as follows:

Spinning method (a) 62 to 64 per cent. $H_2SO_4$.
(b) 63 to 65 per cent. $H_2SO_4$.
(c) and (f) 64 to 66 per cent. $H_2SO_4$.
(d) 64 to 66 per cent. $H_2SO_4$.
(e) 63 to 65 per cent $H_2SO_4$.
(g) 40 per cent. $H_2SO_4$.

VII. (a) to (g)

The spinning solution differs from that used in Example I in that, instead of 30 parts, only 5 parts of trithiocarbonic acid glycerine ester are added to the viscose.

The concentrations of the spinning baths are as follows:—

Spinning method (a) 62 to 64 per cent. $H_2SO_4$.
(b) 62 to 66 per cent. $H_2SO_4$.
(c) and (f) 62 to 66 per cent. $H_2SO_4$.
(d) 64 to 67 per cent. $H_2SO_4$.
(e) 64 to 66 per cent. $H_2SO_4$.
(g) 40 per cent. $H_2SO_4$.

VIII.

The operation is as in any of the preceding examples but with the difference that the alkali cellulose before it is brought together with the carbon disulphide is allowed to ripen for 48 hours at 15° C.

IX.

The mode of operation is as in any of the preceding examples except that the spinning bath contains in addition to the strong sulphuric acid, 10 per cent. of ammonium sulphate.

X.

The operation is as in any of the preceding examples except that the spinning bath contains in addition to the strong sulphuric acid 5–7½ per cent. of glucose.

The foregoing examples can also be varied by using as the spinning bath hydrochloric acid of 40–42 per cent. strength.

XI. (a) and (b)

The spinning solution obtained in accordance with any one of the foregoing prescriptions is spun in known manner in one of the following baths:—

(1) In a solution of ammonium sulphate of 25–30 per cent. strength which solution may be at room temperature or at a raised temperature for example 45° C., or (2) In a bath consisting of 500 parts of sodium bisulphate, 76 parts of sulphuric acid of 66° Bé. and 587 parts of water, which bath may be at room temperature or at a raised temperature, for example 50° C., or (3) In a bath which consists of 982 parts of water, 180 parts of sodium sulphate, 60 parts of ammonium sulphate, 15 parts of zinc sulphate, 135 parts of glucose and 128 parts of sulphuric acid of 66° Bé. which bath may be at a room temperature or at a raised temperature, for example 40° C.

The coagulated threads are passed from either one of the said baths into a bath of the following composition:—

(1) Sulphuric acid of 65–70 per cent. $H_2SO_4$, or (2) Sulphuric acid of 55 per cent. $H_2SO_4$, or (3) A solution of 13.3 parts of ammonium sulphate in 120 parts of sulphuric acid of 62–70 per cent. $H_2SO_4$, to which 9–10 parts of sulphuric acid of 66° Bé. have been added.

The temperature of the second bath may be kept below room temperature, for example at 0–10° C. or at room temperature, or even at a temperature above room temperature, for example at 25–45° C., or over.

The length of immersion of the threads in the second bath may be short, for example 20 centimetres, or long, for example 30 to 120 centimetres or more.

The threads are (if desired) stretched in any known manner, either in the second bath or after they have left this. The stretching may be effected by arranging a large distance between the collecting device and the second bath or the threads may be conducted over one or several rods, hooks or differential rollers, which are arranged between the nozzle and the collecting device in the second bath or outside the latter or in both places.

The threads are collected, while the sulphuric acid is separated therefrom by washing or diluted, as has been described above, and the threads are finally washed completely, dried and treated as described in Example I.

(b) The procedure is as in (a), but with the difference that hydrochloric acid of 32 per cent. strength is used as the second bath.

By following the foregoing examples there is obtained lustrous artificial silk which has a dry tenacity much exceeding 2 grams per denier and a wet tenacity exceeding 1.5 gram per denier and notwithstanding this an extensibility of at least 7 per cent., and in many cases higher.

XII.

The operation is as in any of the preceding examples but with the difference that there is used as the spinning bath a solution of 70 per cent. of zinc chloride in hydrochloric acid of 5 per cent. strength heated to 30° C.

In the foregoing examples the additional stretch can be obtained by other means than those described, for example by use of differential rollers revolving at different speeds.

In all the foregoing examples the action of the acid may be interrupted by exposing the threads, which have left the bath consisting of or containing strong acid, to a low temperature, such as —5° to —15° C. before they are washed, for instance by collecting them on a hollow bobbin which contains a cooling agent, for instance solid carbon dioxide or a freezing mixture or ice.

Examples for making staple fibre follow as a matter of course from the foregoing examples.

The washed threads, before or after they are dried, may be heated or steamed at a high temperature, for example 100–110° C.

Any desulphurizing and bleaching of the threads may be conducted in known manner.

XIII.

A spinning solution made as described in any of the preceding examples is caused to enter in known manner through a suitable funnel or slot into one of the precipitating liquids named in the preceding examples and the coagulated band of film is washed and dried in known manner after it has passed through the bath.

XIV.

A cotton material is impregnated, filled or coated one or several times on a suitable machine, such as a padding machine or a back filling machine or a spreading machine, with a spinning solution which has been made in accordance with any of the preceding examples and to which there has been added a filling material, such as talc or china clay (for example 100–200 per cent. calculated on the weight of the cellulose) or a dyestuff or a pigment, such as mica or soot, and without being dried, in some cases in stretched condition, is passed through a bath which has the composition of one of the coagulating liquids named in the foregoing examples, which liquids have a plasticizing effect on the coagulated dressing or coating material. The dressed or coated fabric is then washed and dried.

In the foregoing examples there may be used instead of $\alpha$-$\alpha'$-trithiocarbonic acid glycerine ester, another trithiocarbonic acid ester of glycerine. For example $\alpha$-$\beta'$-trithiocarbonic acid ester of glycerine or $\alpha$-trithiocarbonic acid ester of glycerine or $\beta$-trithiocarbonic acid ester of glycerine; or a trithiocarbonic acid ester of another di- or polyvalent alcohol, for example a glycol, such as ethylene glycol; or even of a monovalent alcohol, for instance a trithiocarbonic acid diethyl ester or a trithiocarbonic acid propyl ester.

Instead of the strong sulphuric acid or hydrochloric acid, strong nitric acid may be used, for example one containing 60–90 per cent. $HNO_3$, or strong phosphoric acid, for example of 1.5 to 1.86 specific gravity, or strong arsenic acid, for example one containing 60–90 per cent. of $H_3AsO_4$ or a strong zinc chloride solution of about 60 per cent. strength, which contains about 4–6 per cent. hydrochloric acid.

In the foregoing examples there can be used for making the viscose instead of the material named, sulphite cellulose or the like, cotton linters or wood pulp which has been pretreated in the cold or at a raised temperature with a dilute acid, for example hydrochloric acid or sulphuric acid, in short any kind of cellulose material which is used in the viscose art or has been proposed for such use.

The foregoing examples can also be varied in the sense that the alkali cellulose before it is treated with carbon disulphide may be allowed to ripen at 15–20° C. for a shorter period than 48 hours, for instance 24 or 36 hours, or longer than 48 hours, for example 60 or 72 hours.

As a guide with regard to the question whether or not the alkali cellulose should be allowed to mature before being brought together with the carbon bisulphide may, among others, serve the desired viscosity of the solution which is to be worked up into artificial material in general and artificial threads in particular, and in connection therewith the viscosity of the kind of cellulose contemplated. If it is desired to give the solution a definite viscosity then the alkali cellulose produced from the kind of cellulose contemplated, is subjected to a maturing process, if without maturing this kind of cellulose yields a higher viscosity. If, however, it exhibits from the first the desired degree of viscosity, that is without maturing, the maturing is superfluous. Now, as the viscosities of the different kinds of cellulose on the market (linters and wood-pulp) differ very much from one another, the question of maturing depends in most cases on the one hand on the vis-viscosity desired of the initial solution intended for the manufacture of artificial material, and on the other hand on the viscosity of the kind of cellulose being worked.

The term "viscose" used in the description and claims is (as is customary in the art of making artificial materials), intended to denote a solution of an alkali cellulose xanthate.

The expression "artificial threads" includes artificial threads and spun products of all kinds, for instance artificial silk, staple fibre, artificial cotton, artificial wool, artificial hair and artificial straw of any kind. The expression "polyhydroxylic alcohol" used herein, is intended to include alcohols containing two or more (i. e. a plurality) of hydroxyl groups.

The expression "strong mineral acid" in the specification includes sulphuric acid of 40 per cent. $H_2SO_4$, advantageously at least 50 per cent. $H_2SO_4$, and so far as other mineral acids are concerned hydrochloric acid of at least 30 per cent. strength, nitric acid of at least 50 per cent. strength, phosphoric acid of at least 1.2 specific gravity and arsenic acid of at least 70 per cent. $H_3AsO_4$.

The expression "strong sulphuric acid" or "sulphuric acid which contains at least about 40 per cent. of sulphuric acid mono-hydrate" used in the specification means sulphuric acid of 40–98 or 100 per cent. $H_2SO_4$.

For the purpose of more completely showing the difference between the present invention and that covered in Serial No. 435,649, I give the following from said earlier application:—

Viscose is prepared as in Example I of the present case, using the same amounts of the materials, and same conditions there given.

When the dissolution is complete, 20 parts of α-dichlorohydrine (1:3-dichloropropanol-(2)) are added to the viscose, and well stirred in, and the solution is then filtered three times through cotton, two filtrations being carried out soon after its preparation, while the third immediately precedes the spinning process. Before this spinning solution is spun it is left to age for 96 to 100 hours at a temperature of 15° C. The spinning is as follows:—

The spinning solution is pressed at a speed of 3.3 c. c. per minute through a platinum nozzle having 54 perforations of 0.1 mm. diameter, into a bath containing 65 per cent. of $H_2SO_4$ and having a temperature of 16° C., the length of immersion of the thread in the sulphuric acid being 20 cm. The thread is then allowed to pass for 120 cm. through the air and is wound on a bobbin revolving at a speed which produces a speed of spinning of about 18 m. per minute. Three glass rods are placed angularly to one another between the spinning bath and the bobbin over which rods are conducted and are thus subjected to an additional stretching or tension. The lower part of the bobbin revolves in water, so that the sulphuric acid is removed or considerably diluted as soon as the thread arrives at the bobbin. The threads are then washed, purified, dried, twisted and finished in the usual manner.

The threads obtained consist of single filaments of about 2 to 2.5 deniers each.

In other examples in said application 435,649, the speed of spinning is more or less than in this example, the sulphuric acid plasticizing bath is weaker or stronger (55 to 82%), the amount of dichlorhydrin is from half to double that given in this quoted example, the same or other chlorhydrines or halohydrines can be used, and the alkali cellulose can be matured or not, according to the viscosity of the particular cellulose used.

What I claim is:—

1. A process of making artificial materials which comprises acting upon viscose with a trithiocarbonic acid ester of a polyhydroxylic alcohol, and thereafter forming the thus obtained product, in solution, into an artificial material, and acting upon the latter with an agent having a coagulating effect upon the shaped solution, and a plasticizing effect on the coagulated material.

2. A process of making artificial materials which comprises acting upon viscose with a trithiocarbonic acid ester, and thereafter forming the thus obtained product, in solution, into an artificial material, and acting upon the latter with an agent having a coagulating effect upon the shaped solution, and a plasticizing effect on the coagulated material.

3. A process of making artificial materials which comprises acting upon viscose with a trithiocarbonic acid ester of a polyhydroxylic alcohol and acting upon the product in the shape of an artificial material, with a medium containing a mineral acid equivalent to sulphuric acid of at least 35% strength.

4. A process of making artificial materials which comprises acting upon viscose with a trithiocarbonic acid ester and acting upon the product in the shape of an artificial material, with a medium containing a mineral acid equivalent to sulphuric acid of at least 35% strength.

5. The herein described new artificial materials which contain a reaction product of a cellulosic compound with a trithiocarbonic acid ester of a polyhydric alcohol, and which with a trithiocarbonic acid ester (of a polyhydroxylic alcohol) and which artificial material, after repeated extraction successively with hot alcohol, hot ether and hot pyridine, will yield on being treated according to Zeisel's method, an amount of alkyl iodide molecularly equivalent to not substantially below 3% of $C_3H_7O$.

6. A process as in claim 1 in which the artificial material is subjected to a stretching during a part of the process after the commencement of the coagulation, such stretching being in addition to the stretching incidental to the normal formation of the artificial material.

7. A process as in claim 2, in which the trithiocarbonic acid ester used is a trithiocarbonic acid ester of glycerine.

8. In the process of claim 3, the step of checking the action of the mineral acid when the action thereof has progressed sufficiently, and before substantial injury to the artificial material.

9. In the process of claim 5, the step of applying a stretching tension at any stage between the step of introducing the solution through the said suitably formed opening and the final collecting device.

10. A process of making artificial materials which comprises acting upon viscose with a trithiocarbonic acid ester of a polyhydroxylic alcohol, and thereafter causing the thus obtained product to enter through a suitably formed opening directly into a bath containing an agent having a coagulating effect upon the shaped solution, and a plasticizing effect on the coagulated material.

11. In the process of claim 10, the step of applying stretching during the treatment with the plasticizing agent.

12. In the process of claim 10, the step of stretching the artificial material at any time after applying the plasticizing agent and before the final removal of the plasticizing agent from said artificial material.

13. A process as in claim 10, in which the said suitably formed opening is of such a size as to deliver a filament-like stream, whereby an artificial textile thread is produced.

14. A process of making artificial materials which comprises acting upon viscose with a trithiocarbonic acid ester of a polyhydroxylic alcohol, and thereafter forming the thus obtained product, into the shape of an artificial material, and acting upon the latter first with an agent having a coagulating effect upon the shaped solution and thereafter with an agent having a plasticizing effect on the coagulated material.

15. A process of making artificial materials which comprises acting upon viscose with a trithiocarbonic acid ester of glycerine, and thereafter causing the thus obtained product to enter through a suitably formed opening into a bath containing an agent capable of coagulating the same in the form of an artificial material, and treating the latter with a plasticizing agent therefor.

16. A process of making artificial materials which comprises acting upon viscose with a trithiocarbonic acid ester of glycerine and acting upon the product in the shape of an artificial material with sulphuric acid of at least 35% strength.

17. A process which comprises acting upon viscose with a trithiocarbonic acid ester of glycerin, producing an artificial material from the reaction product, and treating such artificial material with a plasticizing agent.

18. A process which comprises acting upon viscose with a trithiocarbonic acid of a glycol, producing an artificial material from the reaction product, and treating such artificial material with a plasticizing agent.

19. A process as in claim 1, in which the artificial material is subjected to a stretching during a part of the process after the commencement of the plasticizing treatment.

20. An artificial thread having a dry tenacity exceeding 2 grams per denier and which on being decomposed with strong hydriodic acid will yield alkyl iodide, such thread being made by coagulating and plasticizing a thread-like stream of a reaction product of viscose with a trithiocarbonic acid ester.

21. An artificial structure having a strength equivalent to that of a thread which has a dry tenacity exceeding 2 grams per denier, and which on being decomposed by heating with strong hydriodic acid will yield alkyl iodide, such artificial structure being made by coagulating and plasticizing a preshaped body of a reaction product of viscose with a trithiocarbonic acid ester.

22. A process of making artificial materials which comprises acting upon viscose with a trithiocarbonic acid ester, and thereafter forming the thus obtained product, in solution, into an artificial material, and acting upon the latter with an agent having a coagulating effect upon the shaped solution, and a plasticizing effect on the coagulated material, without subjecting the artificial material to additional stretching, after the coagulation thereof.

23. A spinning solution suitable for the manufacture of shaped structures, which includes the reaction products of an alkali metal cellulose xanthate and a trithiocarbonic acid ester.

24. A spinning solution suitable for the manufacture of shaped structures, which includes the reaction products of viscose and a trithiocarbonic acid ester of a polyhydric alcohol.

25. A spinning solution suitable for the manufacture of shaped structures, which includes the reaction products of viscose and a trithiocarbonic acid ester of glycerine.

LEON LILIENFELD.